(12) United States Patent
Turnbull (10) Patent No.: US 8,258,981 B2
(45) Date of Patent: Sep. 4, 2012

(54) WARNING APPARATUS AND METHOD (76) Inventor: John Turnbull, Fraserburgh (GB)

( * ) Notice: Subject to any disclaimer, the term of this patent is extended or adjusted under 35 U.S.C. 154(b) by 980 days.

(21) Appl. No.: 12/295,120

(22) PCT Filed: Mar. 29, 2007

(86) PCT No.: PCT/GB2007/001153
§ 371 (c)(1),
(2), (4) Date: Sep. 29, 2008

(87) PCT Pub. No.: WO2007/110654
PCT Pub. Date: Oct. 4, 2007

(65) Prior Publication Data
US 2009/0160678 A1 Jun. 25, 2009

(30) Foreign Application Priority Data

Mar. 29, 2006 (GB) .................................. 0606279.8
May 23, 2006 (GB) .................................. 0610203.2

(51) Int. Cl.
B60Q 1/00 (2006.01)
G08G 1/16 (2006.01)
B60T 7/16 (2006.01)
B60D 1/28 (2006.01)

(52) U.S. Cl. ........ 340/903; 340/435; 340/436; 340/468; 180/167; 180/169; 180/271

(58) Field of Classification Search ........................ None
See application file for complete search history.

(56) References Cited

U.S. PATENT DOCUMENTS

| 5,210,521 | A | | 5/1993 | Hojell et al. | |
|---|---|---|---|---|---|
| 5,281,949 | A | * | 1/1994 | Durley et al. | 340/433 |
| 5,493,269 | A | * | 2/1996 | Durley et al. | 340/433 |
| 5,510,764 | A | * | 4/1996 | Hauptli | 340/433 |
| 5,793,420 | A | * | 8/1998 | Schmidt | 348/148 |
| 6,601,669 | B1 | * | 8/2003 | Agnew | 180/275 |
| 6,864,784 | B1 | * | 3/2005 | Loeb | 340/441 |
| 7,095,336 | B2 | * | 8/2006 | Rodgers et al. | 340/903 |
| 7,099,776 | B2 | * | 8/2006 | King et al. | 701/213 |
| 2002/0097146 | A1 | * | 7/2002 | Harris, III | 340/435 |
| 2003/0141965 | A1 | | 7/2003 | Gunderson et al. | |
| 2006/0109095 | A1 | * | 5/2006 | Takata et al. | 340/436 |
| 2011/0216198 | A1 | * | 9/2011 | Schofield et al. | 348/148 |

FOREIGN PATENT DOCUMENTS

| AU | 2002301529 A1 | 6/2003 |
|---|---|---|
| CA | 2151064 A | 12/1996 |
| EP | 1351207 A1 | 10/2003 |
| EP | 1375267 A2 | 1/2004 |
| FR | 2750522 A1 | 1/1998 |
| FR | 2803568 A1 | 7/2001 |
| GB | 2393835 A | 7/2004 |

* cited by examiner

Primary Examiner — Julie Lieu
(74) Attorney, Agent, or Firm — Fox Rothschild LLP (57) ABSTRACT A warning apparatus for installation on a vehicle is disclosed. The warning apparatus may include a detector for detecting a road hazard and a display that is activated to transmit an alert in response to detection of the hazard.

33 Claims, 4 Drawing Sheets

WARNING APPARATUS AND METHOD

CROSS-REFERENCE TO RELATED APPLICATIONS

This application claims priority to and benefit of International Patent Application PCT/GB2007/001153 with an International Filing Date on Mar. 29, 2007 with subsequent publication as International Publication Number WO 2007/110654 on Oct. 4, 2007. PCT/GB2007/001153, in turn, claims priority to Great Britain Patent Application No. 0606279.9, filed Mar. 29, 2006 and Great Britain Patent Application No. 0610203.2, filed Mar. 23, 2006. The disclosures of each of the aforementioned patent documents are incorporated herein by reference in their entirety.

BACKGROUND

The present invention relates to warning apparatus and a method, and, in particular, to warning apparatus for generating a hazard alert for public safety.

A large number of vehicles are present on roads today and road accidents involving pedestrians and motorists frequently occur, many of these resulting in human fatalities. Accidents may result from dangerous driving, such as driving at speeds in excess of the prescribed speed limits or by driving erratically. Pedestrians at a roadside may not focus their attention towards road hazards and pedestrians crossing a road may be distracted. The level danger of a traffic situation is often misjudged.

There are particular road traffic situations and locations that are of highly susceptible to traffic accidents. In areas near bus stops, there may be children and other people gathering around while vehicles are passing in the road nearby. Pedestrians may also wish to cross the road near the bus. At a bus stop, the bus typically obstructs the view of pedestrians crossing the road and the view of drivers of vehicles passing in the region near the bus. In this situation, road users may not be aware of the nature of the hazard, or even of a hazard being present. In addition, pedestrians wishing to cross the road near the bus may misjudge the speed of an oncoming vehicle. Where buses are involved, a high proportion of accidents involve school children alighting from a school bus.

Currently, motorists are provided with general warnings to take extra care in potentially dangerous areas of the road. For example, speed warning signs are provided at a roadside for informing drivers of a potential hazard. Vehicles are also provided with alert systems in the vehicle to warn passengers to wear a seatbelt, or to mind their step when disembarking from a bus. There also exist bus-based warning systems that can detect pedestrians being present in a pre-determined danger zone around the bus, and alert the pedestrians or driver of the bus that pedestrians have been identified to be present in the danger zone.

A problem with these warning systems is that the alert is not necessarily indicative of the actual danger of a particular situation, and may only take into account certain isolated factors that might contribute to a hazard. For example, the bus-based systems are only concerned with pedestrians, while the actual danger may be caused by a combination of factors, such as overtaking vehicles near the bus, or other road users. These warning systems do not necessarily take into account the real contributors to the hazard, and therefore lack an ability to produce adequate coordinated hazard alerts on this basis.

Alerts that are based on incomplete information about a situation have limited effectiveness, and road users will not necessarily respond appropriately to such alerts. These alerts may even be ignored once a road user has a perception that the alert is unreliable.

A further problem associated with fixed roadside warning signs is that the warning is only applicable to a vehicle at the locality near the sign.

It is an aim of the present invention to provide a system that obviates or at least mitigates the deficiencies and drawbacks associated with the existing systems.

It is an object of at least one embodiment of the invention to provide a warning apparatus that produces an alert according to the level and/or nature of the risk or hazard posed to a road user in a given situation.

It is an object of at least one embodiment of the invention to provide a vehicle-mountable warning apparatus that can produce an alert based on the actual hazard posed to a road user, and is directed towards pedestrians and drivers of other vehicles.

Other aims and objects will become apparent from the following description.

SUMMARY

According to a first aspect of the invention there is provided warning apparatus for installation on a first vehicle, comprising: means for detecting a property of the first vehicle corresponding to a likelihood of pedestrians being present in the vicinity of the first vehicle; and means for detecting a property of a second vehicle; wherein the apparatus is operative to determine a hazard status using the detected properties of the first and second vehicles, and generate an alert to a road user in dependence on the hazard status.

Thus, the present warning apparatus takes into account properties of both the first and second vehicles to determine a hazard status and in generating an alert.

In this way, the apparatus can provide an alert to a road user in dependence on a hazard status that has been determined based on the likelihood of pedestrians being present in the vicinity of the vehicle and a property of a second vehicle. The invention has particular application for vehicles such as buses that have a tendency to pose a hazard to road users, in particular, where there is a likelihood of pedestrians being present, for example, where passengers have alighted from a bus.

In the context of the invention, the term "property" of the first and second vehicles should be considered to encompass a property, status, condition or characteristic of the vehicles.

The apparatus may be adapted to generate an alert according to and/or corresponding to the hazard status.

The hazard status may be a presence/existence (or lack of presence/existence) of a hazard, for example, in the vicinity of the first vehicle. The hazard status may be indicative of and/or may take the form of a nature, type, category, level, and/or severity of a hazard.

The hazard may be a hazard posed by the first vehicle, the second vehicle, and/or the pedestrians in the vicinity of the first vehicle.

The road user may be any one or more of the first vehicle, the second vehicle, at least one pedestrian in the vicinity of the first vehicle, and/or other road users who may be affected.

The apparatus may be adapted to generate an alert that is directed, aimed, targeted toward, the road user and/or the needs of the road user. More specifically, the apparatus may be adapted to generate an alert that is customized to requirements of the road user.

The property of the first vehicle may be selected from the group comprising: a speed of the first vehicle; a status of doors of the first vehicle, e.g., open/closed door status; a behavior of the first vehicle; acceleration or deceleration of the first vehicle; a location of the first vehicle in a high accident risk environment; a status of manually-activated controls; a position of the first vehicle; and a direction of travel of the first vehicle.

The property of the second vehicle may comprise one or more of: a speed of the second vehicle; a behavior of the second vehicle; a distance to the second vehicle; a position of the second vehicle; a direction of travel of the second vehicle; a presence or existence of the second vehicle, for example, in the vicinity of the first vehicle.

The first vehicle may be a bus for transporting passengers, or other large vehicle that may pose a hazard to road users, and/or obscure the view of other road users.

The means for detecting the properties of the first and/or second vehicles may comprise at least one sensor adapted to detect the properties.

Preferably, the status or property of the vehicle may correspond to the presence of pedestrians in the vicinity of the vehicle, or an increased likelihood of pedestrians in the vicinity of the vehicle.

The apparatus may comprise a control unit, which may generate and/or activate the alert. The apparatus may further comprise an alert unit, and in this embodiment, the control unit may activate and/or generate the alert via the alert unit. The alert may be generated in response to the detection of a hazard.

The alert unit may be adapted to transmit an alert to the road user. The alert unit may comprise a display operable to provide a visual alert to the road user. The display may be configured to produce a scrolling image.

The apparatus may be adapted to record data, which may correspond to the detected property of the first and/or second vehicles. The alert unit may comprise a display configured to display the data recorded by the apparatus, such as the speed of the road user.

The apparatus may be adapted to produce at least one signal based on the detected status of the first and/or second vehicle, or a detected status of a pedestrian. The signal may be an activation signal for activating and/or generating the alert. The activation signal may be produced by operating a manual device, for example, a driver-operated control of the first vehicle. The apparatus may be operative to activate and/or generate the alert in response or according to the signal. The activation signal may be produced automatically on detection and/or meeting of a pre-determined condition, or activation criteria, for example, by comparison of a determined hazard status, property of the first and/or second vehicle, and/or a pedestrian or other road user with a pre-set and/or threshold value.

The alert unit may comprise at least one loudspeaker to produce an audible alert in the vicinity of the vehicle. The audible alert may comprise a volume corresponding to the hazard posed by the road user.

Optionally, the alert unit is adapted to be located on an external surface of the vehicle. Preferably, the at least one alert unit is adapted to be fitted to a front and/or rear surface of the vehicle. A second alert unit may be fitted to the rear and/or front surface of the vehicle. A third alert unit may be fitted to a side of the vehicle. The third alert unit may comprise a display unit adapted to be fitted to an offside rear surface of the vehicle.

In another embodiment, the apparatus comprises means for detecting a property of a pedestrian. The means for detecting a status or property of the pedestrian may comprise a sensor adapted to measure the status or property. The status or property may be speed of the pedestrian. The property of the pedestrian may comprise one or more of: a speed of the pedestrian; a distance to the pedestrian; a position of the pedestrian; and a location of the pedestrian, for example, in the vicinity of the first and/or second vehicles; and a direction of travel of the pedestrian.

The apparatus may be operative to determine a likelihood of collision between the pedestrian and the second vehicle using the detected property of the pedestrian and the second vehicle.

The apparatus may comprise a GPS receiver for locating the second vehicle. The apparatus may comprise a GPS transmitter configured to transmit a signal informing emergency services of the position of the first vehicle.

Alternatively, or in addition the apparatus may comprise a video camera operable for obtaining image data of the road user. The apparatus may comprise a speed detection apparatus, such as a speed gun, for measuring speed of the second vehicle. The speed gun may be adapted to be located at a front end of the vehicle. Alternatively, or in addition, the apparatus may comprise a second speed gun adapted to be located at a rear end of the vehicle.

The apparatus may comprise a speed gun for measuring speed of the pedestrian. Alternatively, or in addition, the apparatus may be a radar system for measuring the property of the pedestrian. Alternatively, or in addition, the apparatus may comprise an optical sensor for detecting the presence of a pedestrian.

According to a second aspect of the invention there is provided a passenger carrying vehicle (PCV) comprising the warning apparatus according to the first aspect of the invention.

Preferably, the at least one alert unit provides an alert signal to an exterior of the vehicle. Optionally, the alert unit is fitted to an external surface of the vehicle. The at least one alert unit may be a display unit.

More preferably, the at least one alert unit comprises a first display unit fitted to a front or rear surface of the vehicle. A second alert unit may be fitted to the rear or front surface of the vehicle. A third alert unit may be fitted to a side of the vehicle. The alert unit may comprise a loudspeaker. The third alert unit may comprise a display unit fitted to an offside rear surface of the vehicle.

According to a third aspect of the invention, there is provided a method for warning a road user of a hazard, the method comprising the steps of: providing detection means on a first vehicle; detecting a property of the first vehicle corresponding to a likelihood of pedestrians being present in the vicinity of the first vehicle; detecting a property of a second vehicle; using the detected properties of the first and second vehicles to determine a hazard status; and generating an alert to a road user in dependence on the hazard status.

The road users may be a second vehicle or pedestrians.

Preferably, the method includes the step of measuring a property of the road user.

Preferably, the method includes the step of displaying a visual alert to the other road user.

Embodiments of the third aspect of the present invention may comprise at least one of the above described features of the first and second aspects of the invention.

According to a fourth aspect of the invention, there is provided a method of providing an alert, comprising steps of: determining a hazard by detecting a status of a first vehicle corresponding to a likelihood of pedestrians being present in the vicinity of the vehicle, using apparatus installed on the first vehicle, and detecting a status of a second vehicle; generating an alert in response to the hazard.

According to a fifth aspect of the invention there is provided warning apparatus adapted for installation on a vehicle, the warning apparatus comprising: a control unit, at least one alert unit, and means for detecting a hazard posed by a road user, wherein the control unit is adapted to activate the alert unit in response to the detection of a hazard.

According to a sixth aspect of the invention there is provided a method of providing an alert to one or more road users, the method comprising the steps of: detecting a hazard posed by a road user in the vicinity of a vehicle, using apparatus installed on the vehicle; activating an alert signal to at least one other road user via an alert unit.

According to a seventh aspect of the invention, there is provided a warning system for a moveable vehicle posing a hazard to at least one road user, wherein the system produces an alert to a first road user based on data obtained by the system concerning a second road user.

BRIEF DESCRIPTION OF THE DRAWINGS

There will now be described, by way of example only, embodiments of the invention with reference to the following drawings, of which.

DETAILED DESCRIPTION

Figure 1:
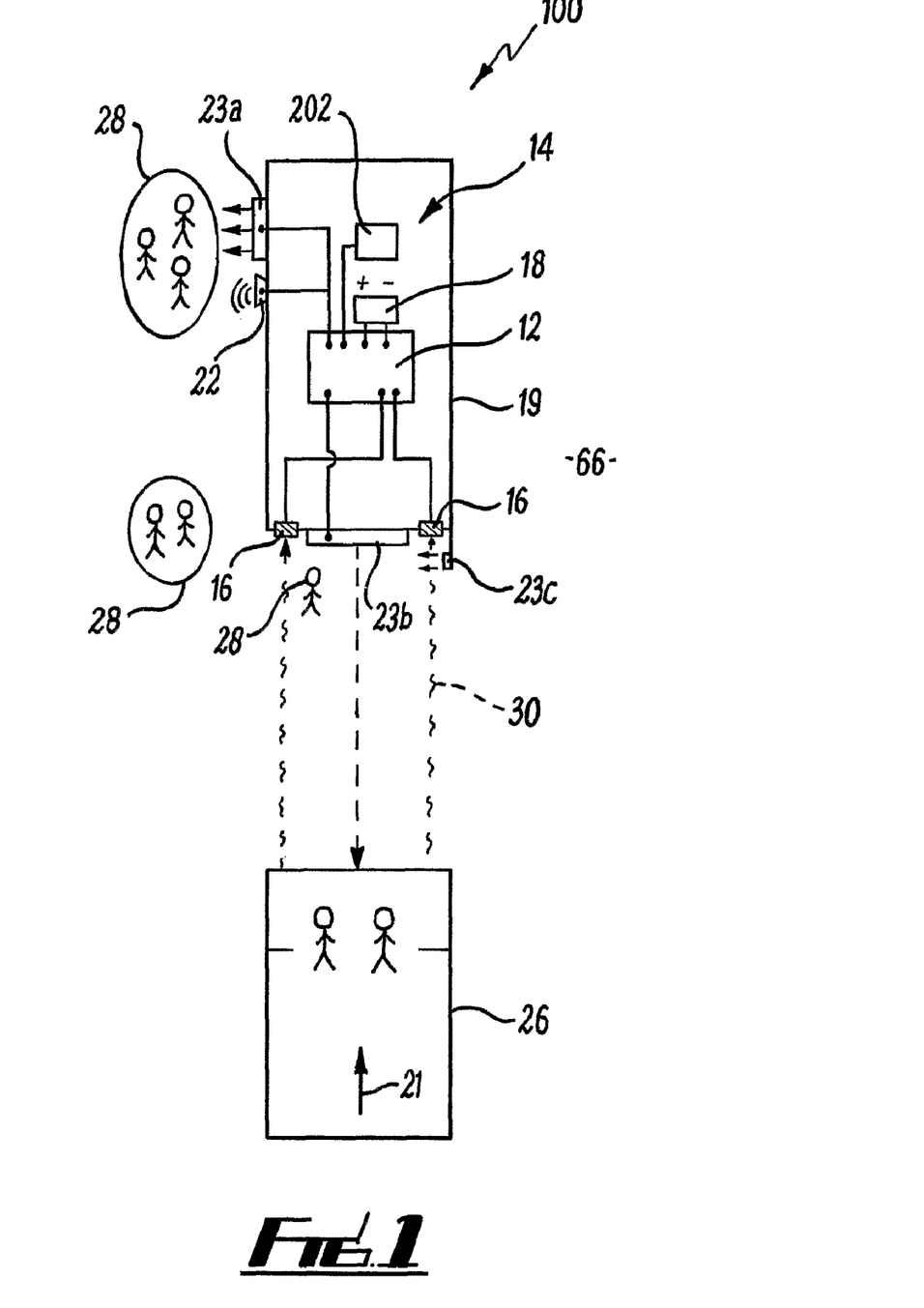
FIG. 1 is a schematic representation of a warning apparatus for road accident prevention according to an embodiment of the invention.

With reference firstly to FIG. 1, there is shown generally a warning apparatus 100 installed on a bus 19 (constituting a first vehicle) stopped at a bus stop.

At the bus stop, the bus doors are opened for passengers to alight, and there is a likelihood of pedestrians being present in the area around the bus as indicated in FIG. 1. The open door condition of the bus is detected by the apparatus 100. The warning apparatus 100 includes optical sensors 16, which are used to detect the presence of a car 26 (constituting a second vehicle) that is approaching the bus 19 from behind, and is due to pull out and overtake the bus. Arrow 21 indicates the general direction of movement of the car 26. The open door condition of the bus and the presence of car is used to determine a hazard status and generate an alert that is based on the hazard status via displays 23a-c and a loudspeaker 22 (constituting alert units).

The apparatus further comprises a control unit 12 (powered by battery 18), also connected a electrical system 202 of the bus. The displays 23a-c and the loudspeaker 22 are connected to the control unit 12.

In the open door condition, there is generated a corresponding vehicle property signal that is received by the control unit 12 via the electrical system 202 of the bus 19. A signal is also fed into the control unit 12 from the sensor upon detection of the second vehicle.

The control unit 12 is programmed to use the vehicle property signal, and the signal from the sensor to determine the hazard status and to generate a visual alert, via the displays 23a-c, accordingly. The control unit 12 also uses the vehicle property signal to determine whether to activate the warning apparatus.

The control unit 12 sends a signal to the displays 23a-c for producing suitable alert as images or messages, in response to the signal received from the sensor 16. The alert is transmitted by the apparatus 100 to the surrounding environment to inform other road users of the hazard associated with the vehicle. The displayed images and messages provide information relevant to the hazard status.

Having sensed an optical property 30 of the car 26 via sensors 16, the control unit generates an alert accordingly, and the displays 23a-c produce a visual warning message or image according to the hazard status. The displays 23a, 23b and 23c comprise light-emitting diodes to provide high-visibility illuminated signs.

The warning message produced by rear display 23b can be seen easily by a driver of the car 26, and alerts the driver of the hazard status in the vicinity of the bus, allowing the car to take appropriate action. In this case, the display 23b produces an image that alternates from the internationally-recognized picture of a woman and a child walking across a road and the message "CAUTION, DANGER—CHILDREN/PEDESTRIANS ALIGHTING", although it will be appreciated that other messages/images may be used in other embodiments.

In a similar way, the display 23a produces a warning message that may be seen by pedestrians 28, e.g. children, near the bus 19, who have disembarked from the bus and wish to cross the road. The speaker 22 produces an audible alert that can be heard by the pedestrians alerting them of the hazard.

The display 23c produces a warning display with information concerning the car 26 that can be seen by pedestrians while crossing a road behind the bus 19. This display 23c is of particular assistance to people of impaired hearing crossing behind the bus, who are otherwise not able to hear alert messages transmitted from the speaker 22. The display 23c is located at the rear offside of the bus 19 to provide an alert prompt to the pedestrians 28 crossing the road at the last point before stepping out from behind the vehicle 19. In this embodiment, the warning alert is formed to be a vertical thin illuminated warning sign located at or near the head height of a child.

The rear display 23b produces a warning targeted towards the driver of the car 26, while the displays 23a and 23c produces a warning targeted at the pedestrians, by providing information relevant and useful to the driver and pedestrians and linked to the hazard status.

The warning or alert message is provided temporarily while the bus is near the bus stop. As the bus 19 moves away a sufficient distance that a reduced or "normal" hazard state has been resumed, the warning apparatus is de-activated. In this example, the control unit 12 is programmed to stop the alert when the bus has pulled away from the bus stop, and reached a certain speed.

Figure 2:
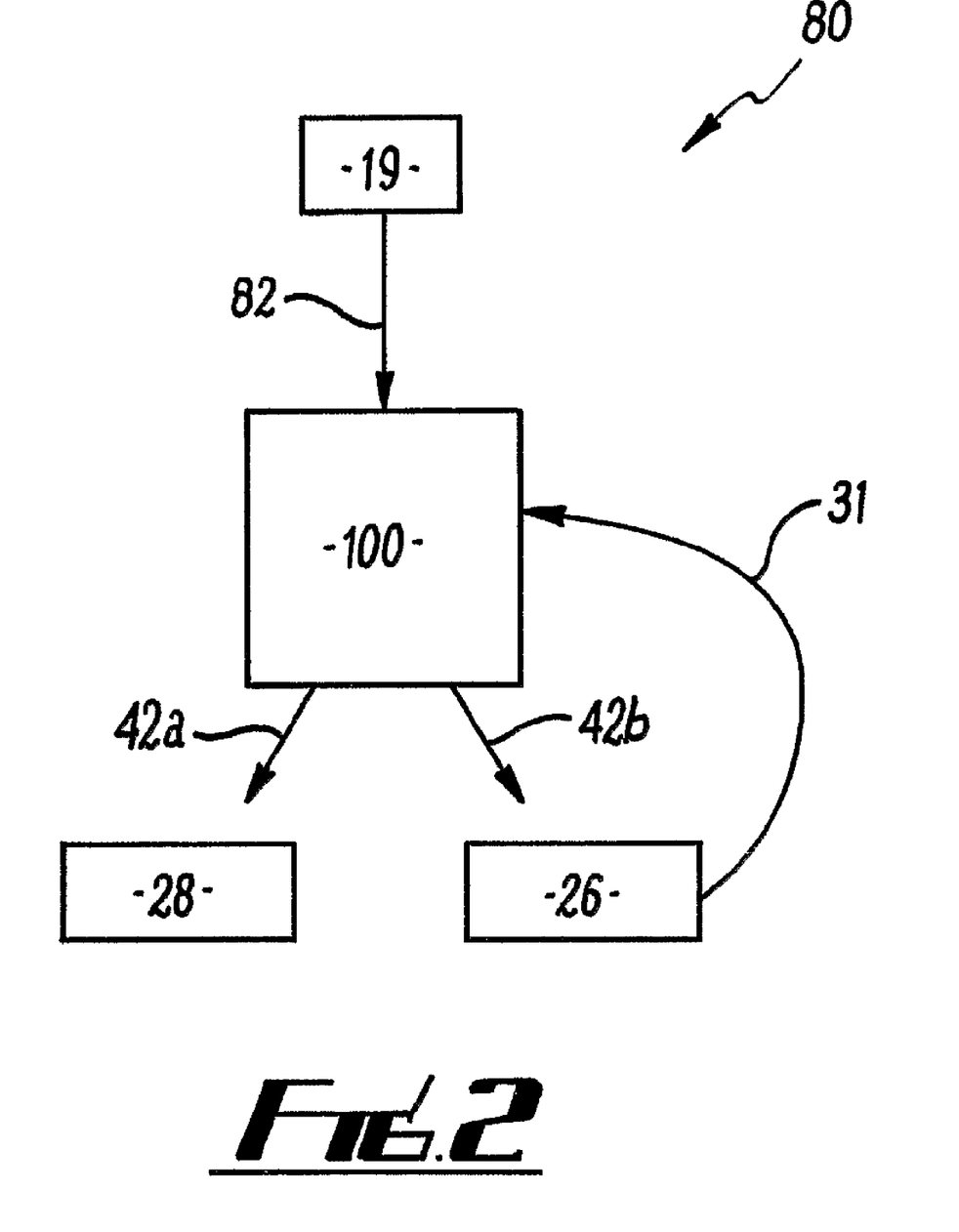
FIG. 2 is a schematic information flow diagram for the warning system of FIG. 2.

FIG. 2 illustrates schematically at 80 the interaction between various components of the warning apparatus 100 fitted to the bus 19.

The apparatus 100 interacts with the bus 19 and receives a vehicle property signal 82 from the bus 19 via the electrical system (not shown) upon the opening of the doors of the bus at a bus stop. The apparatus 100 also receives data 31 corresponding to the detected presence of the car 26 (by optical sensors sensing optical property 30). The vehicle property signal 82 and the presence of the car 26 are used to determine a hazard status and generate and display an appropriate alert message to the pedestrians 28 and the car 26.

The vehicle property signal 82 and presence of the car 26 are used to activate the apparatus 100 and trigger the control unit to output a display message according to the signal and received data.

Thus, the apparatus 100 uses the detected presence of the second vehicle 26 and the property of the vehicle 19, to determine a hazard status and generate an alert accordingly. Thus, the received signal 82 and/or the property 30 of the second motor vehicle is used by the apparatus 100 to produce and display warning alerts 42a, 42b to the motorist 26 and pedestrians 28 that is relevant to the hazard posed by the vehicle 19, pedestrians 28, and second vehicle 26.

In other examples, the apparatus 200 is adapted to comprise speed detection apparatus for detection of the speed of the car 26. The apparatus may also detect the direction of travel of the car 26.

Figure 3A:
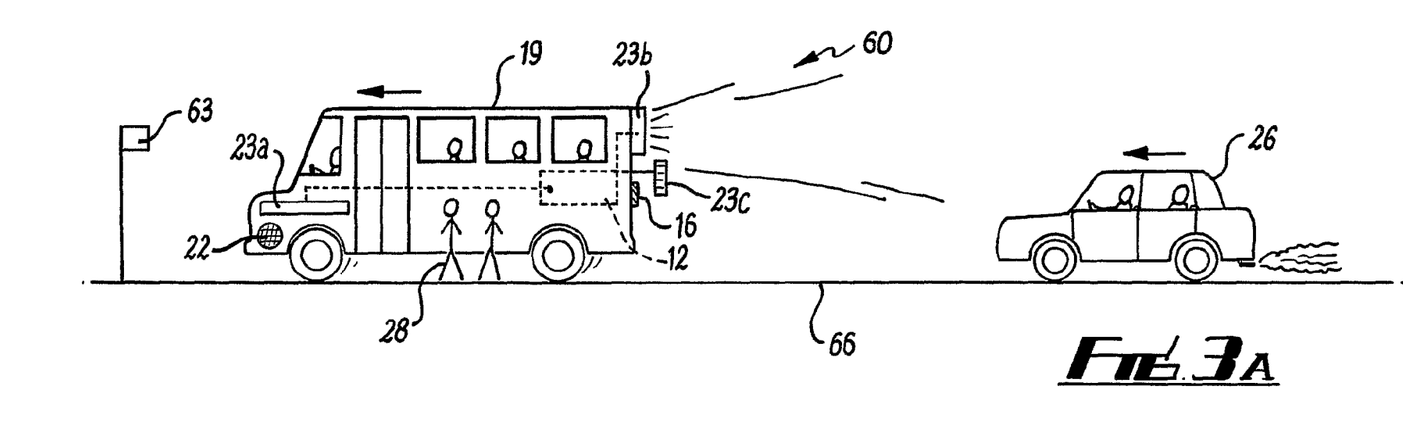
FIG. 3A is a schematic cross-sectional view of a bus in operation with warning apparatus installed according to a further embodiment of the invention.
Figure 3B:
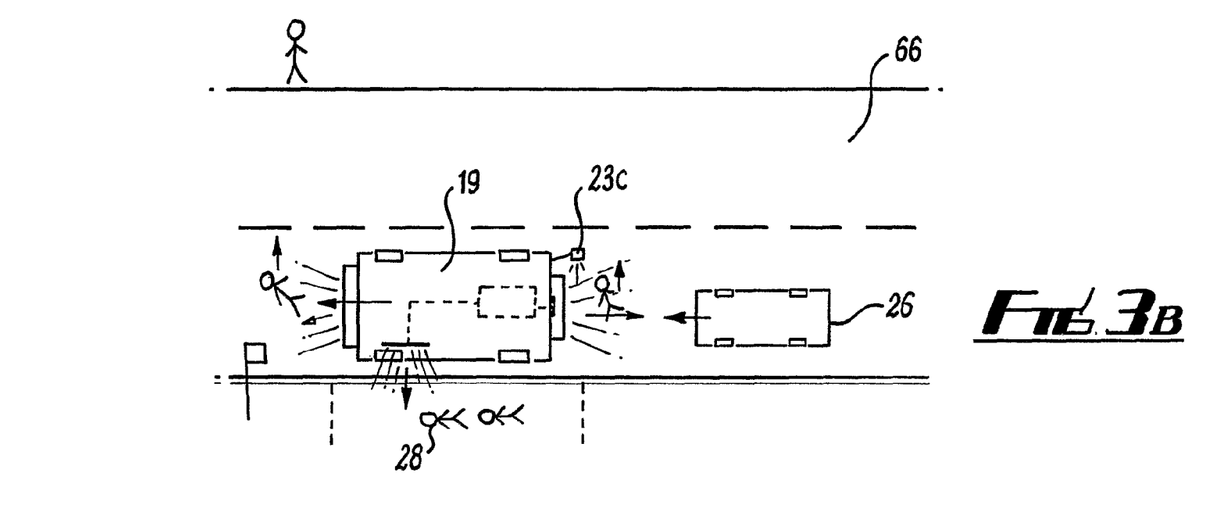
FIG. 3B is a schematic overhead view of the bus of FIG. 3A.

FIGS. 3A and 3B illustrate a similar embodiment to that of FIGS. 1 and 2 with a warning apparatus 100 installed on a use on a bus 19, although it differs in that the sensors detect speed of the car 26. Similar features have the same reference numerals. The bus 19 (passenger carrying vehicle (PCV)) is fitted with side and rear displays 23a,b and speaker 22 is fitted to outer surfaces of the bus 19. A further display 23c is fitted to the offside rear surface of the bus 19. The control unit 12 is installed internally and may be linked to status of the bus as described above.

The bus 19 approaches a bus stop 63 where passengers are waiting to board the bus. A speeding car 26 is traveling along a road 66 nearby and behind the bus 62.

When the bus stops, the doors open to produce a vehicle property signal and the warning apparatus 100 is activated. The sensors 16, detect the speed of the speeding car 26 in the vicinity of the bus 19.

When the car 64 is speeding, the bus displays a warning message to alert road users/drivers of vehicles of the presence of pedestrians 28, such as children. The warning message produced by the system is a bright red scrolling high visibility display message for capturing the attention of the drivers.

The bus 62 also displays a message via display 23a to passengers at the bus stop that there is a speeding car and that care should be taken. This message may be a bright yellow scrolling message.

Display 23c mounted to the offside of the bus and positioned to transmit a visual alert toward the onside indicates to passengers crossing behind the bus that there is a speeding car approaching. The display 23c functions to prompt the passengers behind the vehicle, in particular any passengers with impaired hearing, to be careful.

These messages display data concerning the speed or direction of travel of the car 26 in order that the pedestrians/drivers may take action to avoid an accident.

The driver of the bus manually initiates additional alerts by sending a manual vehicle property signal 82 to the control unit 12 of the system. As the bus pulls away, the alerts continue to be produced until the bus exceeds a certain speed or a low hazard status has been determined. The system is then de-activated.

Figure 4:
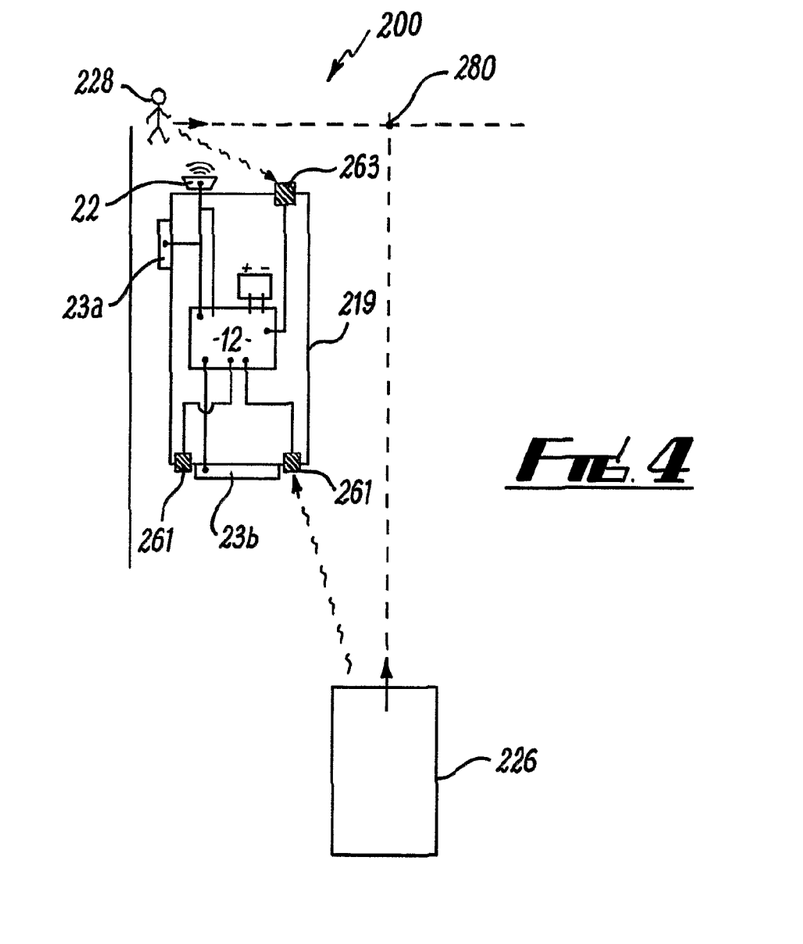
FIG. 4 is a schematic representation of a warning system for road accident prevention according to a further embodiment of the invention.

In another embodiment, FIG. 4 depicts generally at 200 a warning apparatus fitted to a bus 219 and configured to warn of potential collision of pedestrians 228 and a car 226.

In this embodiment, the sensors comprise a speed gun for detecting the speed of the car 226. The display 223b displays a relevant warning message to the driver of the car 226. The display alternately shows the messages "SLOW DOWN"; "TOO FAST:" followed by the speed of the car 26; and/or "BEWARE PEDESTRIANS" and is a moving or scrolling message. The moving message attracts the attention of the driver of the car 26 and prompts the driver to take positive action to reduce the hazard of the particular road situation.

Messages concerning the car 226, such as "VEHICLE APPROACHING QUICKLY FROM RIGHT"; "DO NOT CROSS", are displayed to the pedestrians via displays 23a and/or 23c in an alternating fashion. These messages are moving messages to catch the attention of the pedestrians and are relevant to the hazard situation, prompting the pedestrians to assess the danger and take action to limit the risk of accident.

The radar guns function to detect the speed of the second car 226 in front, behind, or to the sides of the bus 19. The radar guns 261, 263 are also adapted to take into account distance, position, and direction of travel of the pedestrian 28 and second vehicle.

In this embodiment, the warning apparatus 210 comprises an additional sensor 263 fitted toward the front end of the bus 219 which is used to detect a characteristic of the pedestrian 228. More specifically, the sensor 263 functions to detect the speed of the pedestrian. At the same time, the sensors 261a,b located at the rear of the bus 219 are used to measure the speed of the car 226 moving toward the bus 219 and due to overtake it.

The views of both the pedestrian 228 and the driver of the vehicle 226 are obstructed, such that the driver of the vehicle 26 can not see the pedestrian 28 and vice versa. Using the measured speed of the pedestrian 28 and the speed of the vehicle 226, the warning apparatus 200 determines if the second vehicle 226 overtaking the first vehicle is likely to collide with the pedestrian 228 crossing the road at a potential impact point 280.

If the pedestrian 228 and the car 226 are on a course for collision, an alert is generated and transmitted to the pedestrian 228 and the car 226 to warn them of the hazard, for example, depending on the likelihood of collision. In this case, the alert to the pedestrian 228 is an audible alert transmitted by the loudspeaker 222. A visible alert is produced and transmitted to the driver of the second vehicle 226 via the display 223b. The display produces an alternating scrolling message with the words: "WARNING—POTENTIAL COLLISION"; "YOU ARE ON A COLLISION COURSE WITH A PEDESTRIAN". Thus, a warning that is relevant to the hazard status near the bus is produced by the warning apparatus 200.

The detected speed of the pedestrian 228 and car 226 information is processed by the control unit 12 of the warning apparatus to calculate the point of potential collision 280.

Figure 5:
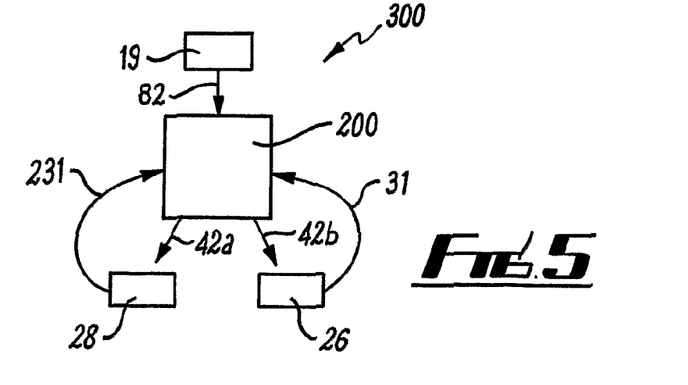
FIG. 5 is a schematic information flow diagram for the warning system of FIG. 4.

In FIG. 5, there is shown generally at 300 the interaction between various components of a road safety warning system comprising the warning apparatus 200 fitted on the bus 219.

This is similar to the interaction as described with reference to FIG. 2, except that the warning apparatus 200 also takes into account information 231 that is characteristic of the pedestrians 228 in order to determine the information displayed concerning the road hazard. The system warns of an actual impending collision of the pedestrians 228, such as children near the warning apparatus and the car 226.

In an alternative embodiment (not shown), the sensor 263 is adapted to detect pedestrians 228 of different heights. A plurality of sensors similar to the sensor 263 are located at different heights for this purpose. By detection of a pedestrian of a specific height, an assumption about the age of the pedestrian may be made and an alert provided accordingly.

In a further embodiment (not shown), a warning apparatus comprises an alternative speed detection system, such as a dual beam optical detection system. In this case, first and second light beams are emitted from the vehicle and are spaced a known distance apart. As a pedestrian 228 walks across the road, the first and second beams each become modified at different times as the pedestrian 228 passes by. In this way, the pedestrian 228 is detected in two places at two different times, allowing the speed of the pedestrian to be determined. The light beam may for example be a laser beam.

It will be appreciated that in various embodiments, a sensor similar to sensor 263 for detecting the pedestrian could be positioned and used to detect a pedestrian crossing a road either in front of or behind the first vehicle 219. In addition, the pedestrian detection sensors may be controlled by a control computer located on the vehicle 219. This control computer, the pedestrian detection sensor 263 and alert unit 22 may be provided separately from the other components of the warning apparatus 14.

In yet another embodiment (not shown), the system may include a GPS receiver for receiving information concerning the position of the first vehicle 219. The information provided via GPS receiver may be used to configure the warning system to produce a display in accordance with the requirements of the locality. For example, GPS data may include speed limit data for the locality that can be used to provide updated information of whether the second vehicle is speeding. The GPS receiver could be used to detect that the vehicle is in an accident hotspot, or close to a bus stop at which passengers are alighting. The warning apparatus may also include a video camera to record an image a second vehicle. The image data may be referred to in the event of an accident.

Further, in other embodiments, the bus may also include a transmitter, activated to transmit an alert signal containing the position of the first vehicle. This alert signal is used to alert emergency services, for example, if a collision arises in the vicinity of the bus. The signal could be picked up by a GPS receiver of an emergency vehicle. If the collision occurs under suspicious circumstances security services are alerted. The transmission of a signal could be controlled by the driver, for example, by signal may be sent when the driver depresses a control button, or could be generated automatically.

Different levels of alert may be communicated in this way. Similarly, if the driver is at risk of being assaulted, the driver may transmit an alert in this way.

The rapid provision to the emergency services of an accurate GPS position helps to improve response time of emergency services in the event of an accident.

The apparatus thus obtains information and data concerning a traffic situation and may obtain information concerning speed, distance, or position of a second vehicle, to determine a hazard status and transmit a suitable alert.

In summary, the present apparatus and method provides an alert to a road user according to a hazard status, such as the level of a hazard, and warns the road user based on data acquired by the system that is relevant to the actual situation, e.g., data containing a detected property of an overtaking car and a property of the vehicle corresponding to a likely presence of pedestrians near the vehicle. In embodiments of the invention, hazard detection equipment and display signs are located on a vehicle to obtain and display data relating to the hazard, and to warn other road users of the hazard.

This reduces the risk of users ignoring the warnings, improves road safety and reduces the risk of accidents occurring.

The warnings are made relevant by obtaining and/or measuring real time data concerning road users in the area nearby the vehicle and producing an alert based on these data. This serves to improve safety in the region near the vehicle 19 that is a safety hazard.

The use of signs to display information, such as speed information, is a particular advantage as when such information is considered by a conscientious driver, the driver is likely to feel duty bound to reduce their speed, particularly where children are likely to be at risk.

Various modifications and improvements may be made without departing from the invention described herein.

It will be appreciated that sensors could be located at the front, rear or side of the bus 19.

In another embodiment, a message could be transmitted via a display mounted near the front of a bus 19 to warn a pedestrian of being on a collision course with an oncoming car.

It will be appreciated that the apparatus described could be de-activated after a fixed time period has elapsed or when the speed or acceleration of the bus is detected as being over a predetermined threshold.

In other embodiments, a vehicle property signal can be generated manually by a driver of the bus 19 by pressing a control button in situations where the driver considers there to be a risk; the vehicle property signal conveying information concerning the behavior of the bus 19, such as its speed, location, acceleration or opening of doors.

The vehicle property signal might be generated automatically. In a yet further embodiment, a property of the bus might be detected by sensors to produce a vehicle property signal that is sent automatically from the sensors. Such sensors might, for example, detect that the bus has stopped, or that the door of the bus has opened. Alternatively, the sensor may detect that a passenger has alighted from the bus, for example by an optical sensor or pressure sensor.

The apparatus may also include memory storage to record data from the sensors over a time period.

It will be appreciated that the sensors 261, 263 could comprise a transmitter and receiver for transmitting a signal and receiving a response from a vehicle or pedestrian. The sensors for detecting a pedestrian could comprise a radar transmitter-receiver for detecting position, speed, and distance parameters, and may comprise a radar gun.

The invention claimed is:

1. A warning apparatus for installation on a first vehicle, comprising:
   a mechanism for detecting a property of the first vehicle corresponding to a likelihood of pedestrians being present in a vicinity of the first vehicle; and
   a mechanism for detecting a property of a second vehicle, wherein the apparatus is operative to determine a hazard status using the detected properties of the first and second vehicles, and generate an alert to a road user in dependence on the hazard status, wherein the apparatus comprises a speed detecting apparatus for measuring a speed of the second vehicle.

2. The warning apparatus of claim 1, wherein the apparatus comprises a control unit operative to generate the alert.

3. The warning apparatus of claim 2, wherein the apparatus comprises an alert unit, and the control unit is operative to generate the alert via the alert unit in response to the hazard status.

4. A warning apparatus adapted for installation on a first vehicle, the warning apparatus comprising:
   a control unit;
     at least one alert unit adapted to be activated to provide an alert to an exterior of the first vehicle;
     a mechanism for detecting a status or property of the first vehicle, the status or property of the first vehicle corresponding to an increased likelihood of pedestrians being present in the vicinity of the first vehicle; and a mechanism for detecting a status or property of a second vehicle, wherein the apparatus is adapted to detect a hazard posed by a road user using the detected properties of the first and second vehicles and the control unit is adapted to activate the alert unit in response to the detection of the hazard.

5. The warning apparatus of claim 4, wherein the property of the first vehicle is selected from the group comprising:

a speed of the first vehicle;
a behavior of the first vehicle;
an open door status of the first vehicle;
an acceleration or deceleration of the first vehicle;
a location of the first vehicle in a high accident risk environment;
status of one or more manually-activated controls;
a position of the first vehicle; and
a direction of travel of the first vehicle.

6. The warning apparatus of claim 4, wherein the property of the second vehicle comprises one or more of:

a speed of the second vehicle;
a behavior of the second vehicle;
a distance to the second vehicle;
a position of the second vehicle;
a direction of travel of the second vehicle; and
a presence of the second vehicle.

7. The warning apparatus of claim 4, wherein the mechanism for detecting the property of the second vehicle comprises at least one sensor adapted to detect the property.

8. The warning apparatus of claim 4, wherein the apparatus is operative to determine a likelihood of collision between a pedestrian and the second vehicle.

9. The warning apparatus of claim 8, wherein the apparatus comprises a mechanism for detecting a property of the pedestrian, and the likelihood of collision is determined using the detected property of the pedestrian and the second vehicle.

10. The warning apparatus of claim 9, wherein the mechanism for detecting a property of the pedestrian comprises a sensor adapted to measure the property.

11. The warning apparatus of claim 9, wherein the property of the pedestrian comprises a direction of travel of the pedestrian.

12. The warning apparatus of claim 4, wherein the apparatus is operative to generate an alert that is targeted toward the road user to which the alert is generated.

13. The warning apparatus of claim 4, wherein the road user to which the alert is generated is at least one of: the first vehicle; the second vehicle; and at least one pedestrian.

14. The warning apparatus of claim 4, wherein the apparatus comprises a display operable to provide a visible alert to the road user.

15. The warning apparatus of claim 4, wherein the apparatus comprises a display configured to display data recorded by the apparatus, the data corresponding to the detected property of the second vehicle.

16. The warning apparatus of claim 4, wherein the apparatus comprises at least one loudspeaker to produce an audible alert in a vicinity of the first vehicle.

17. The warning apparatus of claim 4, wherein the alert unit is adapted to be located on an external surface of the first vehicle.

18. The warning apparatus of claim 4, wherein the apparatus comprises a video camera operable for obtaining image data of the road user.

19. The warning apparatus of claim 4, wherein the apparatus comprises a GPS receiver for locating the first vehicle.

20. The warning apparatus of claim 4, wherein the apparatus comprises a transmitter configured to transmit a signal for informing emergency services of a position of the first vehicle.

21. A passenger carrying vehicle comprising:

a warning apparatus installed on the passenger carrying vehicle, the passenger carrying vehicle constituting a first vehicle, wherein the warning apparatus comprises:

a control unit;

at least one alert unit adapted to be activated to provide an alert to an exterior of the first vehicle;

a mechanism for detecting a status or property of the first vehicle, the status or property of the first vehicle corresponding to an increased likelihood of pedestrians being present in the vicinity of the first vehicle; and a mechanism for detecting a status or property of a second vehicle, wherein the apparatus is adapted to detect a hazard posed by a road user using the detected properties of the first and second vehicles and the control unit is adapted to activate the alert unit in response to the detection of the hazard.

22. The method for warning a road user of a hazard, the method comprising:

providing a detection mechanism on a first vehicle;

detecting a property of the first vehicle corresponding to a likelihood of pedestrians being present in a vicinity of the first vehicle;

detecting a property of a second vehicle;

using the detected properties of the first and second vehicles to determine a hazard status; and generating an alert to a road user in dependence on the hazard status, wherein the method comprises detecting a speed of the second vehicle.

23. The method of claim 22, wherein the method comprises:

detecting an opening of doors of the first vehicle; and
using the opening of doors in determining the hazard status.

24. The method of claim 22, wherein the method comprises:

detecting a position of the first vehicle in a hazardous location; and
using the position in determining the hazard status.

25. The method of claim 22, wherein the method comprises:

detecting a pedestrian in a vicinity of the first vehicle; and
using the detection of the pedestrian in determining the hazard status.

26. The method of claim 22, wherein the method comprises:

detecting a direction of travel of a pedestrian; and
using the direction of travel of the pedestrian to determine a likelihood of collision of the pedestrian and the second vehicle.

27. The method of claim 26, wherein the method comprises:

detecting a direction of travel of the second vehicle; and
using the direction of travel of the second vehicle in determining a likelihood of collision of the pedestrian and the second vehicle.

28. The method of claim 22, wherein the method comprises alerting the second vehicle of a hazard.

29. The method of claim 22, wherein the method comprises alerting a pedestrian of a hazard.

30. The method of claim 22, wherein the method comprises displaying an alert message to the road user according to the hazard status.

31. The method of claim 22, wherein the method comprises displaying a visible alert to the road user according to the hazard status.

32. The method of claim 22, wherein the method comprises informing emergency services of a position of the first vehicle.

33. A method of providing an alert to one or more road users, the method comprising:
   providing a warning apparatus on a first vehicle, the warning apparatus comprising:
      a control unit;
      at least one alert unit adapted to be activated to provide an alert to an exterior of the first vehicle;
      a first vehicle detector mechanism for detecting a status or property of the first vehicle, the status or property of the first vehicle corresponding to an increased likelihood of pedestrians being present in the vicinity of the first vehicle; and
      a second vehicle detector mechanism for detecting a status or property of a second vehicle, wherein the apparatus is adapted to detect a hazard posed by a road user using the detected properties of the first and second vehicles and the control unit is adapted to activate the alert unit in response to the detection of the hazard;
   the method further including:
      using the first vehicle detector mechanism to detect a status or property of the first vehicle corresponding to an increased likelihood of pedestrians being present in the vicinity of the vehicle;
      using the second vehicle detector mechanism to detect a status or property of a second vehicle;
      detecting a hazard posed by a road user in the vicinity of the first vehicle, using the detected properties of the first and second vehicles provided by the first and second vehicle detector mechanisms installed on the first vehicle; and
      triggering the control unit to activate the alert unit in response to the detection of the hazard thereby providing an alert signal to an exterior of the first vehicle so as to alert at least one other road user.

* * * * *